United States Patent
Kobayashi et al.

(10) Patent No.: US 12,499,800 B2
(45) Date of Patent: Dec. 16, 2025

(54) IN-VEHICLE DISPLAY DEVICE

(71) Applicant: TOYOTA JIDOSHA KABUSHIKI KAISHA, Aichi-ken (JP)

(72) Inventors: Yoshimi Kobayashi, Toyota (JP); Yuto Korogi, Nagakute (JP); Katsunori Yamada, Toyota (JP); Yasushi Dohnoue, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 127 days.

(21) Appl. No.: 18/393,677

(22) Filed: Dec. 22, 2023

(65) Prior Publication Data
US 2024/0221569 A1 Jul. 4, 2024

(30) Foreign Application Priority Data
Dec. 28, 2022 (JP) .................. 2022-211229

(51) Int. Cl.
*G09G 3/20* (2006.01)
(52) U.S. Cl.
CPC ....... *G09G 3/20* (2013.01); *G09G 2320/0686* (2013.01); *G09G 2340/045* (2013.01); *G09G 2340/0464* (2013.01); *G09G 2340/12* (2013.01); *G09G 2354/00* (2013.01); *G09G 2380/10* (2013.01)
(58) Field of Classification Search
CPC ............. G09G 3/20; G09G 2320/0686; G09G 2340/045; G09G 2340/0464; G09G 2340/12; G09G 2354/00; G09G 2380/10; B60R 2300/20
See application file for complete search history.

(56) References Cited

U.S. PATENT DOCUMENTS

| | | | | |
|---|---|---|---|---|
| 5,966,680 A | * | 10/1999 | Butnaru | G02B 27/017 |
| | | | | 702/150 |
| 7,918,781 B1 | * | 4/2011 | Smyth | A61M 21/00 |
| | | | | 600/27 |
| 8,708,884 B1 | * | 4/2014 | Smyth | A61M 21/00 |
| | | | | 706/15 |
| 10,912,916 B2 | * | 2/2021 | Dry | A61M 21/02 |

(Continued)

FOREIGN PATENT DOCUMENTS

| | | | | |
|---|---|---|---|---|
| DE | 102020212420 A1 | * | 4/2022 | ........... B60R 16/037 |
| JP | 2006040056 A | | 2/2006 | |

(Continued)

*Primary Examiner* — Kent W Chang
*Assistant Examiner* — Matthew Clothier
(74) *Attorney, Agent, or Firm* — HAUPTMAN HAM, LLP (57) ABSTRACT

The processor displays the image content and the anti-carsickness content for suppressing car sickness of the viewer on the display unit. The processor changes the ratio of the display area of the image content to the display area of the anti-carsickness content so that the larger the variation of the image content, the smaller the display area of the image content to the display area of the anti-carsickness content. Alternatively, the processor changes the ratio of the display area of the image content to the display area of the anti-carsickness content so that the lower the viewer's tolerance for carsickness, the smaller the display area of the image content to the display area of the anti-carsickness content.

11 Claims, 6 Drawing Sheets

(56) References Cited

U.S. PATENT DOCUMENTS

| | | | |
|---|---|---|---|
| 2019/0061655 A1* | 2/2019 | Son | B60R 1/23 |
| 2022/0024459 A1* | 1/2022 | Park | B60W 50/16 |
| 2022/0144086 A1 | 5/2022 | Sakurai et al. | |
| 2024/0109413 A1* | 4/2024 | Poornachandran | B60K 35/53 |

FOREIGN PATENT DOCUMENTS

| | | | | |
|---|---|---|---|---|
| JP | 2006248450 A | 9/2006 | | |
| JP | 2008242251 A | 10/2008 | | |
| JP | 2017-171117 A | 9/2017 | | |
| JP | 2022-076859 A | 5/2022 | | |
| WO | WO-2023126669 A1 * | 7/2023 | | B60K 35/10 |

* cited by examiner

IN-VEHICLE DISPLAY DEVICE

CROSS REFERENCE TO RELATED APPLICATION

This application claims priority to Japanese Patent Application No. 2022-211229 filed on Dec. 28, 2022, which is incorporated herein by reference in its entirety including the specification, claims, drawings, and abstract.

TECHNICAL FIELD

The present disclosure relates to an improvement to the in-vehicle display system.

BACKGROUND

JP 2022-76859 A discloses an in-vehicle display device. The in-vehicle display device has an acceleration prediction unit and a display control unit. The acceleration prediction section predicts the direction and magnitude of acceleration acting on the vehicle based on the vehicle's planned route, information on the vehicle's surroundings, and information from the acceleration sensor provided in the vehicle. The display control unit displays the direction of the predicted acceleration on a display target in the vehicle cabin. The in-vehicle display device informs the vehicle occupants of the direction and magnitude of the acceleration before the acceleration acts on the vehicle, thereby reducing the occupants' car sickness.

Consider carsickness in viewers viewing in-vehicle display devices. There are various theories as to the cause of carsickness, but the Sensory conflict theory is currently the most popular. Sensory conflict theory states that carsickness is caused by a discrepancy between vestibular information obtained from the vestibular organ, a sensory organ in the inner ear that controls gravity and linear acceleration, and visual information obtained from the eyes. For example, consider a case in which a viewer moving in a vehicle pays attention to an in-vehicle display device showing a still image. In this case, since the viewer himself is moving in the vehicle, the vestibular information indicates that the viewer is moving, but since the viewer is paying attention to the still image, the visual information indicates that the viewer is not moving (since the viewer and the in-vehicle display device (still image) are moving at the same speed and their relative positions do not change). The Sensory conflict theory states that this discrepancy between vestibular information and visual information causes carsickness.

Therefore, it is conceivable to display anti-carsickness content on an In-vehicle display device to reduce the difference between the viewer's vestibular information and visual information in order to suppress the viewer's carsickness based on the Sensory conflict theory. For example, anti-carsickness content include a group of dots moving on the display (display) to represent the flow of scenery outside the vehicle relative to the running vehicle to make the viewer feel movement as visual information. Or, as anti-carsickness content, there are cross icons that tilt (rotate) on the display according to the tilt of the vehicle to make the viewer feel the tilt of the vehicle (viewer) as the viewer's visual information.

On the other hand, the In-vehicle display device also displays image content. There are various types of image content, for example, online conference screens, still images, moving images, or game screens. Since image content often shows visual information that is different from the vestibular information of a viewer in a moving vehicle, it often affects the viewer in the direction of car sickness.

As described above, in-vehicle display devices may display anti-carsickness content along with image content. Although we want to display image contento that viewers can enjoy the image content, the image content affect the direction in which viewers get carsick. Therefore, it is desirable to display the image content in a way that is as easy for the viewer to see as possible, while giving priority to suppressing the viewer's car sickness by the anti-carsickness content.

The purpose of the In-vehicle display device disclosed herein is to enable the viewer to view the image content as suitably as possible while giving priority to suppressing the viewer's car sickness by the anti-carsickness content.

SUMMARY

An in-vehicle display device disclosed in the present specification is an in-vehicle display device provided in a cabin of a vehicle, the in-vehicle display device comprising:
a processor and a display unit, wherein
the processor is configured to display, on the display unit, image content and anti-carsickness content for suppressing carsickness of a viewer viewing the in-vehicle display device,
the processor is configured to change a ratio of a display area of the image content to a display area of the anti-carsickness content to reduce the display area of the image content relative to the display area of the anti-carsickness content as an amount of content variation of the image content increases, or
the processor is configured to change the ratio of the display area of the image content to the display area of the anti-carsickness content to reduce the display area of the image content relative to the display area of the anti-carsickness content for lower tolerance of the viewer for carsickness, and
the tolerance of the viewer for carsickness is identified based on a detection signal from a visual sensor or a biometric sensor sensing the viewer.

It is considered that the larger the amount of content variation of the image content, the more likely the viewer is to get carsick. Therefore, according to the configuration, the larger the content variation of the image content, the smaller the display area of the image content relative to the display area of the anti-carsickness content, thereby enabling the viewer to view the image content in the largest size possible while prioritizing the suppression of the viewer's carsickness. If the viewer's tolerance for car sickness is low, it is necessary to display the anti-carsickness content in a larger size to further suppress the viewer's car sickness. Therefore, according to the configuration, the lower the viewer's tolerance for carsickness, the smaller the display area of the image content relative to the display area of the anti-carsickness content, thereby enabling the viewer to view the image content in the largest size possible while prioritizing the suppression of the viewer's carsickness.

The processor may be configured to increase brightness of the anti-carsickness content for a greater amount of content variation in the image content, or
the processor may be configured to increase the brightness of the anti-carsickness content for lower tolerance of the viewer for carsickness.

It is considered that the larger the luminance of the anti-carsickness content, the more prominent the anti-carsickness content becomes and the greater the effect of the anti-carsickness content. Therefore, according to this configuration, the larger the amount of content variation in the image content or the lower the viewer's tolerance for carsickness, the greater the effect of the anti-carsickness content can be by increasing the brightness of the anti-carsickness content.

The anti-carsickness content may include a group of dots moving on the display unit to represent passing of an exterior scenery with respect to the vehicle as the vehicle travels,
 the group of dots may be displayed at a periphery the image content,
 the processor may be configured to, when the display area of the image content is reduced, decrease brightness of the group of dots in a difference region to be less than brightness of the group of dots displayed at an outside periphery of the difference region, and
 the difference area is an area where the image content is displayed before the reduction and where the image content is not displayed after the reduction.

When image content is reduced in size, the difference region may come within the effective field of view that includes the viewer's central field of view. In this case, the viewer may feel annoyed if the group of dots moves in the difference region that is in the effective field of view including the central field of view. According to this configuration, the luminance of the group of dots in the difference region can be reduced to reduce the annoyance felt by the viewer.

The anti-carsickness content may include a group of dots moving on the display unit to represent passing of an exterior scenery with respect to the vehicle as the vehicle travels,
 the processor may be configured to decrease the brightness of the group of dots as a speed of the vehicle increases.

As the speed of the vehicle increases, the speed at which the group of dots moves also increases. Regardless of the display area of the image content (even if the group of dots is located in the peripheral field of view of the viewer), the viewer may feel annoyed if the group of dots moves too fast. According to this configuration, when the speed of the vehicle is large, the annoyance felt by the viewer due to the fast movement of the group of dots 34 can be reduced.

The anti-carsickness content may include a group of dots representing in perspective the exterior scenery of the vehicle, and moving on the display unit to represent passing of the exterior scenery with respect to the vehicle as the vehicle travels, and
 the processor may be configured to move a lower end position of a display area of the group of dots to an upper side of the display unit as the speed of the vehicle increases.

When the exterior scenery is represented by a group of dots using perspective, the upper side of the display shows the rear side of the exterior scenery, and the lower side of the display shows the front side of the exterior scenery. Therefore, the speed of movement of the group of dots is larger on the lower side of the display than on the upper side of the display. According to this configuration, the viewer can reduce the annoyance felt by the high-speed movement of the group of dots displayed especially in the lower part of the display.

In-vehicle display devices disclosed herein allow the viewer to suitably view image content as well, while prioritizing the suppression of the viewer's carsickness by anti-carsickness content.

BRIEF DESCRIPTION OF DRAWINGS

Embodiment(s) of the present disclosure will be described based on the following figures, wherein.

DESCRIPTION OF EMBODIMENTS

Figure 1:
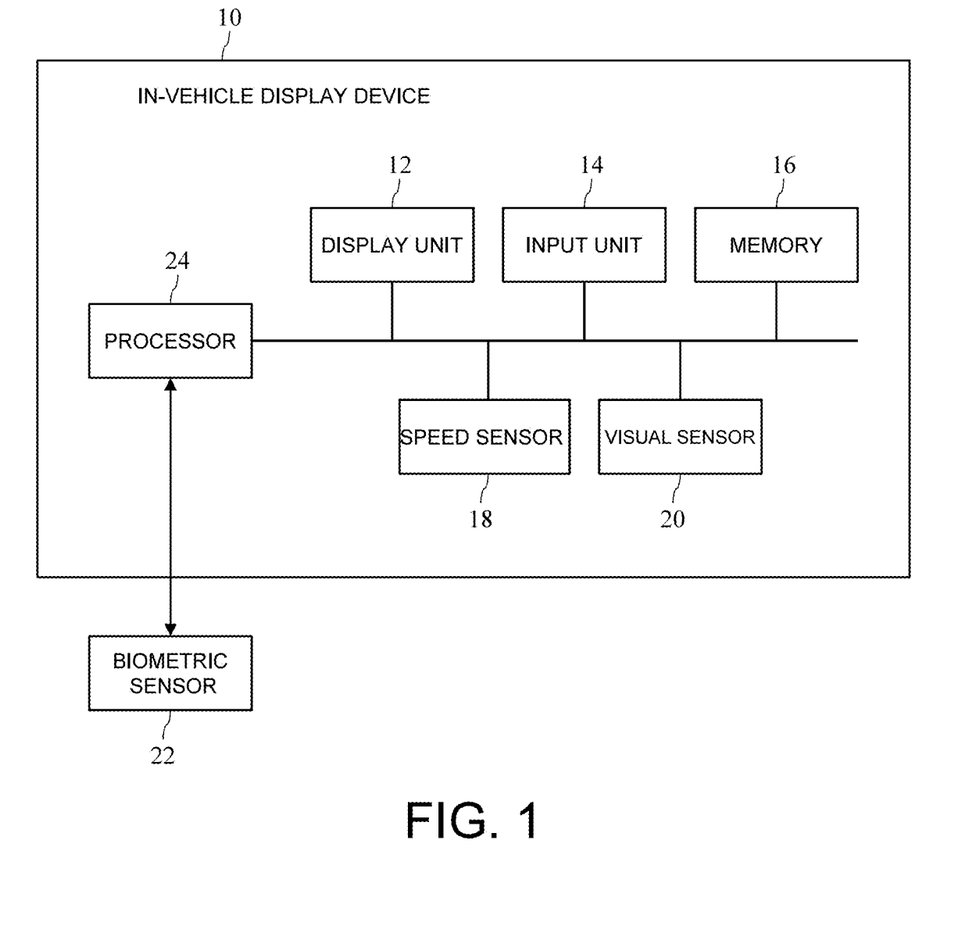
FIG. 1 is a functional block diagram of the In-vehicle display device.

FIG. 1 is a functional block diagram of the In-vehicle display device 10. In-vehicle display device 10 is a display device provided in the cabin of a vehicle, such as an automobile. The vehicle in which the in-vehicle display device 10 is provided (hereinafter simply referred to as "vehicle") may be manually driven by the driver or may be an automatic vehicle in which the computer performs driving control.

The display unit 12 is a display including, for example, a liquid crystal display or an organic EL (Electro Luminescence) display. Various screens are displayed on the display unit 12 by display control by the processor 24, which will be described later. The details will be described later, but image content and anti-carsickness content are displayed on the display unit 12.

The input unit 14 includes a touch panel and various buttons. The input unit 14 is used to input instructions from a viewer (hereinafter simply described as "viewer") viewing the In-vehicle display device 10 (in detail, the display unit 12) to the In-vehicle display device 10.

The memory 16 includes, for example, ROM (Read Only Memory) and RAM (Random Access Memory). The memory 16 stores an In-vehicle display program for operating the various parts of the In-vehicle display device 10. The in-vehicle display program can be stored in a computer-readable, non-transitory storage medium, such as a USB (Universal Serial Bus) memory or CD-ROM, for example. The processor 24 can read and execute the in-vehicle display program from such a storage medium.

The speed sensor 18 is a sensor that detects the speed of the vehicle. The visual sensor 20 is a sensor, such as a camera, that takes a picture of a viewer (especially his/her face). The vehicle speed sensor 18 and the visual sensor 20 transmit detection signals to the processor 24.

The biometric sensor 22 is a sensor worn by the viewer and detects, for example, the viewer's pulse rate, perspiration rate, and nasal surface temperature. The biometric sensor 22 is capable of communicating with the In-vehicle display device 10 (in particular, the processor 24) and transmits detection signals to the processor 24.

The processor 24 comprises for example, a CPU (Central Processing Unit) GPU (Graphics Processing Unit), or ASIC (Application Specific Integrated Circuit). The processor 24 may be configured not by a single processor, but by the collaboration of multiple processors that are physically located at a distance from each other. The processor 24 displays the image content and the anti-carsickness content to control the viewer's carsickness on the display 12. The various display modes of the image content and the anti-carsickness content on the display 12 are described below with reference to FIGS. 2 to 6.

Figure 2:
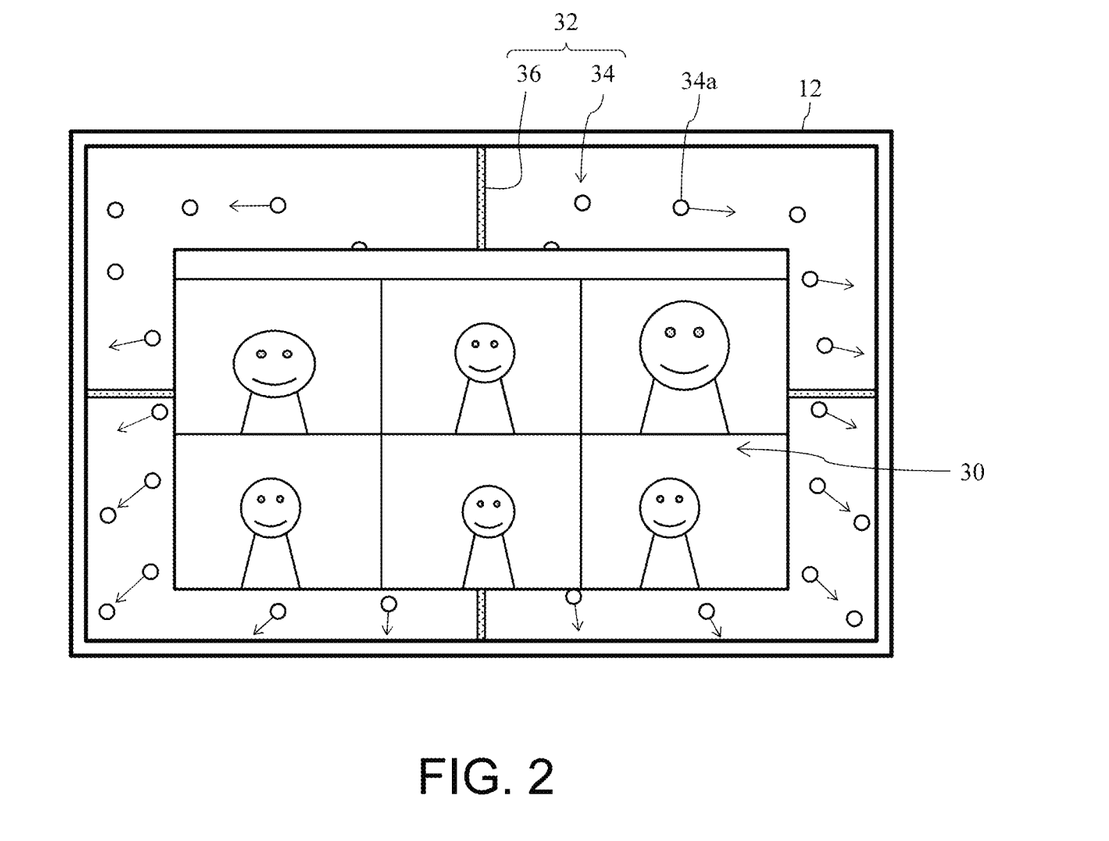
FIG. 2 shows a display example of image content and anti-carsickness content in the case where the amount of content variation of image content is small.

FIG. 2 shows an example of the display of image content 30 and anti-carsickness content 32 displayed on the display 12. As mentioned above, there are various types of image content 30, such as screens of online conferences, still images, moving images, or game screens. In the example in FIG. 2, the screen of an online conference is displayed as image content 30. For example, in a vehicle that can be driven automatically, the driving control is left to the computer, and the occupants can use the In-vehicle display device 10 to conduct an online conference until they reach their destination.

In this embodiment, the anti-carsickness content 32 comprises a group of dots 34 consisting of a plurality of dots 34a, and a cross icon 36.

Although not limited to this, in this embodiment, each point 34a in the group of dots 34 is represented by a mass of high-intensity pixels. Each point 34a moves on the display 12 to represent the flow of the exterior landscape relative to the vehicle as the vehicle travels. The processor 24 can display the group of dots 34 moving on the display 12. The group of dots 34 moves on the display 12 based on map data that defines the road on which the vehicle runs and the structures around that road, and changes in the vehicle's position on the map data obtained from a Global Positioning System (GPS) device (not shown in FIG. 1) provided with the vehicle.

Alternatively, the processor 24 can display the group of dots 34 moving on the display 12 based on a moving image obtained by a camera (not shown in FIG. 1) provided in the vehicle that takes pictures of the area around the vehicle. According to such an example, the group of dots 34 can also represent a shape that mimics the actual scenery outside the vehicle. In particular, the group of dots 34 can represent the scenery outside the vehicle in perspective. Note that the group of dots 34 does not necessarily have to imitate the shape of the actual exterior scenery.

Some of the points 34a in FIG. 2 are indicated by arrows to show the direction of their movement. By displaying a group of dots 34 moving on the display 12, it is possible to provide visual information of movements similar to those perceived by the viewer as vestibular information. This reduces the difference between the viewer's vestibular information and visual information, and suppresses the viewer's car sickness.

Although partially hidden by the image content 30 in FIG. 2, the crosshair icon 36 is a crosshair icon composed of a vertical line crossing the display 12 vertically and a horizontal line crossing the display 12 horizontally. Processor 24 detects the tilt of the vehicle by means of an acceleration sensor (not shown in FIG. 1) or other sensor provided in the vehicle. Processor 24 rotates the cross icon 36 on the display 12 using its center as an axis in accordance with the detected tilt of the vehicle. In this way, a tilt close to the tilt of the vehicle (the viewer) that the viewer perceives as vestibular information can be given to the viewer as visual information. Therefore, the difference between the viewer's vestibular information and the visual information is reduced, and the viewer's car sickness is suppressed.

In this embodiment, the image content 30 are displayed in the center of the display 12, and the anti-carsickness content 32 are displayed around the image content 30. This makes it easier for the image content 30 to be located in the effective field of view including the viewer's central field of view and the anti-carsickness content 32 to be located in the viewer's peripheral field of view when the viewer looks at the display part 12. The viewer can easily view the image content 30 when the image content 30 are positioned in the effective field of view that includes the central field of view. In addition, it is said that the peripheral vision is sensitive to movement, and it is expected that the anti-carsickness content 32 will be more effective in suppressing carsickness by the anti-carsickness content 32 when the anti-carsickness content 32 are located in the peripheral vision. The display position of the image content 30 and the anti-carsickness content 32 is not limited to this.

The image content 30 are considered to influence the viewer's carsickness. In particular, the larger the amount of variation in the content of the image content 30, the more likely the viewer is to become carsick. The amount of content variation of the image content 30 represents how much the image (frame) displayed as the image content 30 changes over time, and can be rephrased as the size of the frame-to-frame difference per unit of time. The inter-frame difference can be, for example, the sum of the differences in the pixel values of each pixel between consecutive frames in the time direction.

Accordingly, the processor 24 changes the ratio between the display area of the image content 30 and the display area of the anti-carsickness content 32 so that the larger the amount of content variation of the image content 30 displayed on the display 12, the smaller the display area of the image content 30 relative to the display area of the anti-carsickness content 32. The ratio between the display area of the image content 30 and the display area of the anti-carsickness content 32 is changed so that the display area of the image content 30 becomes smaller than the display area of the anti-carsickness content 32.

The processor 24 can obtain the amount of content variation of the image content 30 by analyzing the image content 30 that the viewer has instructed to be displayed. Alternatively, the processor 24 can store in the memory 16 the average amount of content variation for each type of the image content 30 (e.g., still image, online conference screen, video, game screen) in advance, and based on the type of the image content 30 input by the viewer from the input unit 14, the processor 24 can obtain the amount of content variation for the image content 30 The amount of content variation of the image content 30 may be specified based on the type of image content 30 input by the viewer from the input unit 14.

Figure 3:
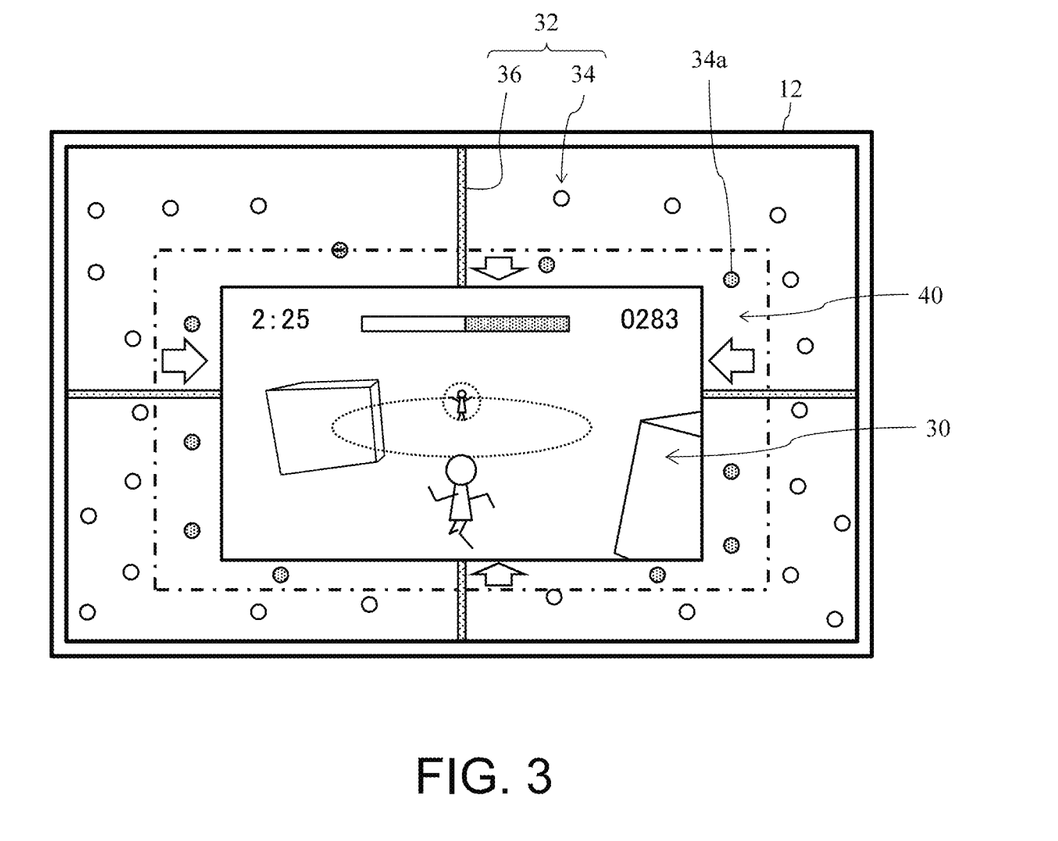
FIG. 3 shows a first display example of image content and anti-carsickness content when the amount of variation in the content of the image content is large.

FIG. 3 shows an example of the display of image content 30 and anti-carsickness content 32 on the display 12 when the image content 30 is a game screen. For game screens, the amount of content variation of the image content 30 is quite large. Therefore, in this case, the processor 24 reduces the display area of the image content 30, as indicated by the arrows in FIG. 3. As described below, at this time, processor 24 either increases the display area of the anti-carsickness content 32 or does not change the display area of the anti-carsickness content 32. As a result, the display area of the image content 30 relative to the display area of the anti-carsickness content 32 becomes smaller. The processor 24 may increase the amount of reduction of the image content 30 as the amount of content variation of the image content 30 is larger. Expressions such as "the larger the xx is, the larger the xx is" in this specification include gradually increasing the xx as the xx gradually increases, and also include increasing the xx by a predetermined amount when the xx is above a predetermined threshold value.

The effect of the anti-carsickness content 32 is considered to be greater when the luminance of the anti-carsickness content 32 is greater, because the anti-carsickness content 32 becomes more noticeable when the luminance of the anti-carsickness content 32 is greater. Therefore, the processor 24 may increase the luminance of the anti-carsickness content 32 (at least one of the group of dots 34 or the cross icon 36) as the amount of content variation of the image content 30 is larger.

The processor 24 may also change the ratio between the display area of the image content 30 and the display area of the anti-carsickness content 32 so that the lower the viewer's tolerance for carsickness, the smaller the display area of the image content 30 relative to the display area of the anti-carsickness content 32.

The processor 24 can identify the car sickness tolerance of the viewer based on the detection signal of the visual sensor 20 or the biometric sensor 22. For example, if the visual sensor 20 detects that the viewer is pale, then this is an element indicating that the viewer has a low tolerance for carsickness. If the biometric sensor 22 detects that the viewer's heart rate is increasing, that the viewer is sweating, or that the viewer's nasal surface temperature is increasing, these are also factors that indicate that the viewer has a low tolerance for carsickness. If the viewer himself/herself knows his/her own tolerance for sickness, the viewer may input information indicating his/her own tolerance for sickness from the input unit 14. The processor 24 can identify the viewer's intoxication tolerance based on said input.

If the viewer's carsickness tolerance is quite high (carsickness tolerance ≥the first carsickness tolerance threshold), the processor 24 may display the image content 30 on the full screen of the display portion 12 without displaying the anti-carsickness content 32. On the other hand, when the car sickness tolerance of the viewer is quite low (when the car sickness tolerance <the second car sickness tolerance threshold. Here, the second car sickness tolerance threshold <the first car sickness tolerance threshold), the processor 24 may display the anti-carsickness content 32 on all the screens of the display 12 without displaying the image content 30. If the viewer's carsickness tolerance is above the second carsickness tolerance threshold and below the first carsickness tolerance threshold, processor 24 may increase the amount of reduction of the image content 30 as the viewer's carsickness tolerance is smaller. In this case, the processor 24 also increases the display area of the anti-carsickness content 32 when the image content 30 is reduced, or the display area of the anti-carsickness content 32 is unchanged.

In order to improve the effectiveness of the anti-carsickness content 32, the processor 24 may increase the brightness of the anti-carsickness content 32 the lower the viewer's tolerance for carsickness.

The single-dotted line in FIG. 3 shows the outline of the image content 30 before reduction. In this specification, the area where the image content 30 is displayed before reduction and where the image content 30 is not displayed after reduction (the area inside the single-dotted line in FIG. 3 and the area around the image content 30 after reduction) is called the "difference area 40".

The processor 24 can also display the anti-carsickness content 32 in the difference area 40 after the reduction of the image content 30. In this case, the display area of the anti-carsickness content 32 becomes larger as the image content 30 shrink. Here, when the image content 30 are reduced in size, the difference area 40 may come within the effective field of view including the central field of view of the viewer. In this case, the viewer may feel annoyed if the group of dots 34 is moving in the difference region 40 that is within the effective field of view that includes the viewer's central field of view. Therefore, the processor 24 may want to make the luminance of the group of dots 34 in the difference region 40 smaller than the luminance of the group of dots 34 displayed in the outer periphery of the difference region 40 (i.e., the area where the group of dots 34 was displayed before the image content 30 was reduced). In FIG. 3, the group of dots 34 in the difference region 40 with a smaller luminance is represented by the shaded group of dots 34.

Figure 4:
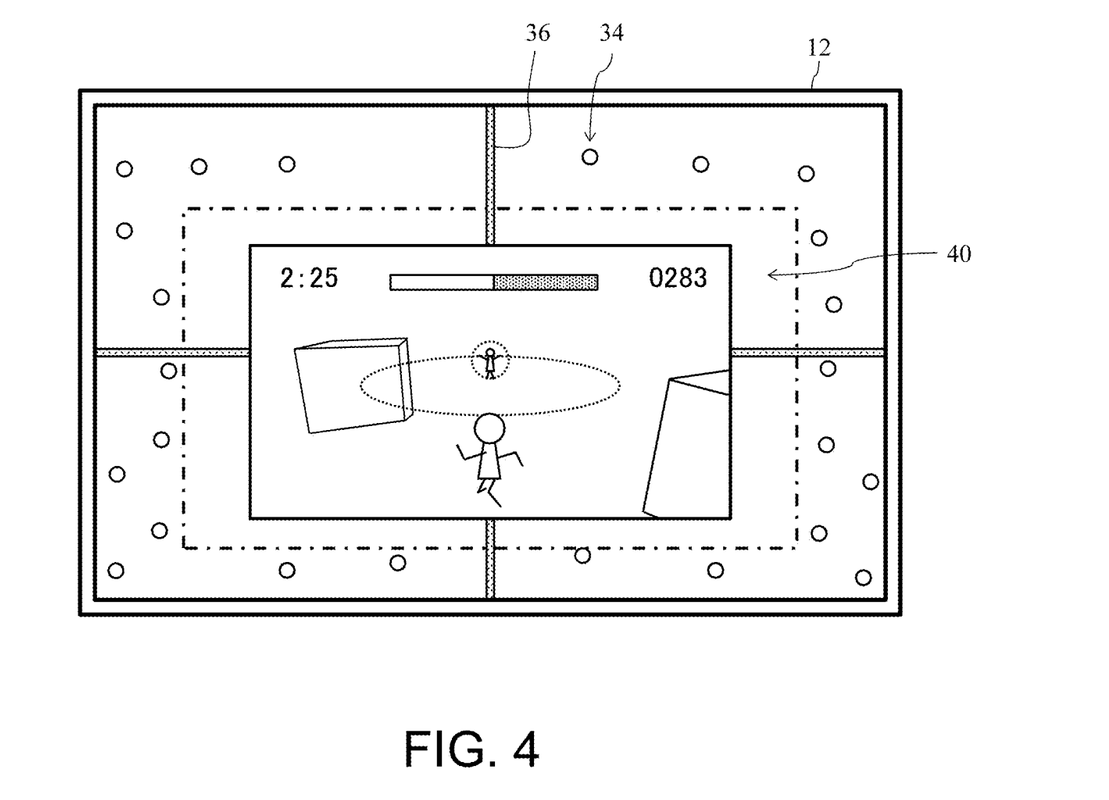
FIG. 4 shows a second display example of image content and anti-carsickness content when the amount of variation in the content of the image content is large.

As shown in FIG. 4, the processor 24 may not display the group of dots 34 in the difference region 40. In this case, the display area of the anti-carsickness content 32 is not changed as the image content 30 is reduced.

In this embodiment, processor 24 displays the cross icon 36 in the difference region 40. However, processor 24 may make the luminance of the cross icon 36 in the difference area 40 smaller than the luminance of the cross icon 36 displayed around the outside of the difference area 40, or may not display the cross icon 36 in the difference area 40.

Figure 5:
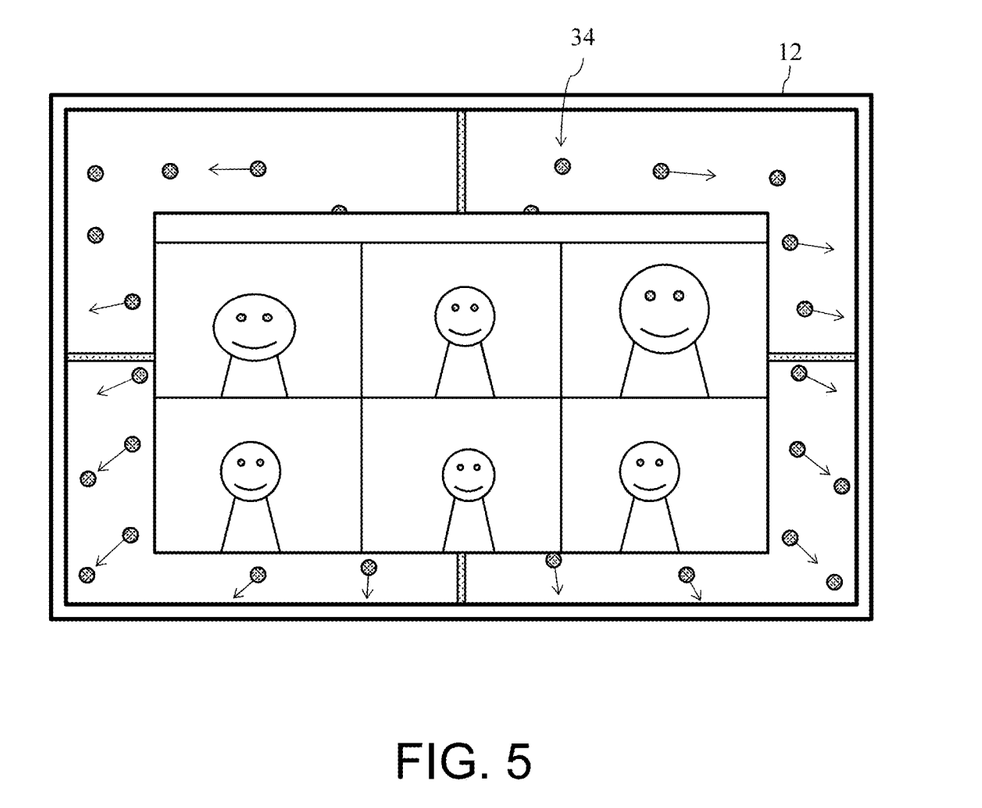
FIG. 5 shows a first display example of a group of dots when the vehicle speed is large.

As the speed of the vehicle increases, the speed at which the group of dots 34 moves also increases. Regardless of the display area of the image content 30 (even if the group of dots 34 is located in the peripheral field of view of the viewer), the viewer may feel annoyed if the speed of movement of dots 34 is fast. Therefore, processor 24 may want to reduce the luminance of group of dots 34 the greater the speed of the vehicle, based on the detection signal of vehicle speed sensor 18. In FIG. 5, the group of dots 34 with a smaller luminance is represented by the shaded group of dots 34.

When the exterior scenery is represented by the group of dots 34 in perspective, the upper side of the display 12 shows the back side of the exterior scenery, and the lower side of the display 12 shows the front side of the exterior scenery. Therefore, the speed of movement of the group of dots 34 is higher on the lower side of the display 12 than on the upper side of the display 12. Therefore, when the speed of the vehicle is high, the speed of movement of the group of dots 34 on the lower side of the display 12 is greater than that on the upper side of the display 12, and the group of dots 34 on the lower side of the display 12 is more bothersome to the viewer.

Figure 6:
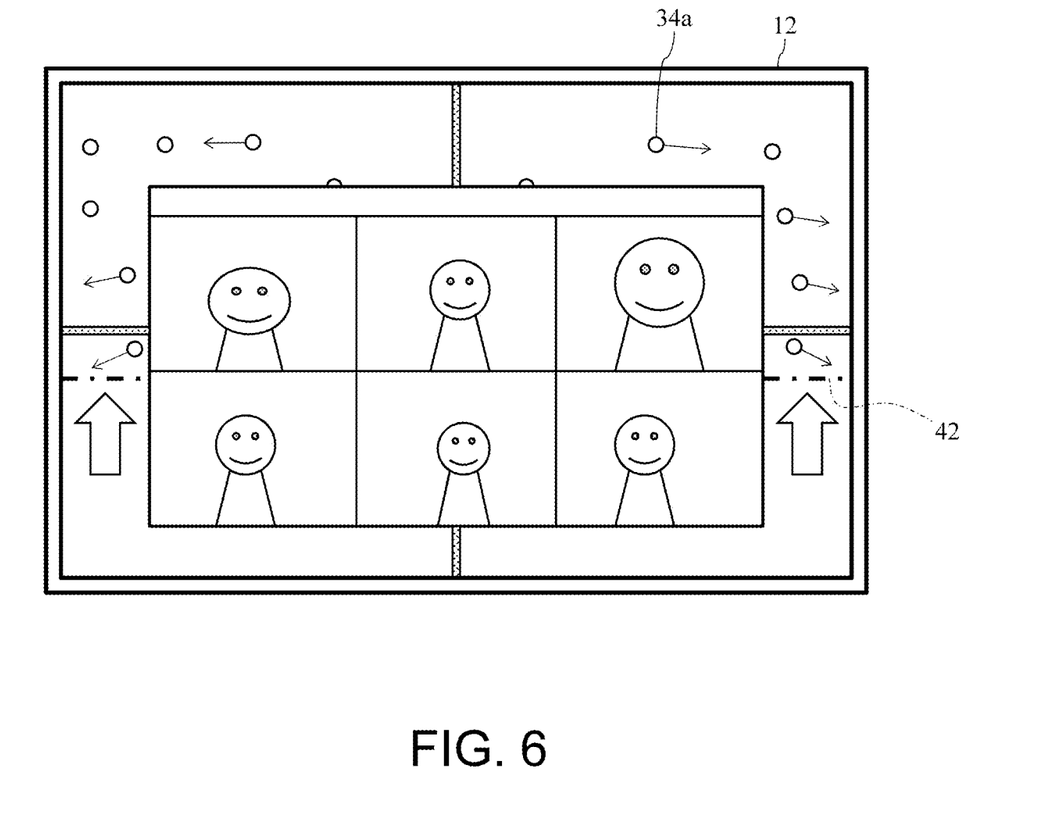
FIG. 6 shows a second display example of a group of dots when the vehicle speed is large.

Therefore, as shown in FIG. 6, the processor 24 may move the lower end position 42 of the display area of the group of dots 34 to the upper side of the display 12 as the speed of the vehicle is greater, based on the detection signal of the vehicle speed sensor 18. The group of dots 34 will not be displayed in the area below the lower end position 42. Alternatively, the greater the speed of the vehicle, the processor 24 may not change the display area of the group of dots 34, but may make the luminance of the group of dots 34 displayed in the lower end of the display area of the group of dots 34, which is the area of the predetermined range on the lower side of the display area of the group of dots 34, lower than that of the upper side of the display 12, which is above the lower side area. The luminance of the 34 dots in the upper region of the display 12 should be smaller than that of the 34 dots in the lower region.

In-vehicle display devices of the present disclosure are not limited to the above embodiments, but can be modified in various ways without departing from the intent of the above embodiments.

The invention claimed is:

1. An in-vehicle display device provided in a cabin of a vehicle, the in-vehicle display device comprising:
a processor; and
a display unit, wherein
the processor is configured to display, on the display unit, image content and anti-carsickness content for suppressing carsickness of a viewer viewing the in-vehicle display device,
the processor is configured to change a ratio of a display area of the image content to a display area of the anti-carsickness content to reduce the display area of the image content relative to the display area of the anti-carsickness content as an amount of content variation of the image content increases, or
the processor is configured to change the ratio of the display area of the image content to the display area of the anti-carsickness content to reduce the display area of the image content relative to the display area of the anti-carsickness content for lower tolerance of the viewer for carsickness, and
the tolerance of the viewer for carsickness is identified based on a detection signal from a visual sensor or a biometric sensor sensing the viewer,
the anti-carsickness content includes a group of dots moving on the display unit to represent passing of an exterior scenery with respect to the vehicle as the vehicle travels,
the group of dots is displayed at a periphery of the image content,
the processor is configured to, in response to the display area of the image content being reduced, decrease brightness of the group of dots in a difference region to be less than brightness of the group of dots displayed at an outside periphery of the difference region, and
the difference region is a region where the image content is displayed before the reduction and where the image content is not displayed after the reduction.

2. The in-vehicle display device according to claim 1, wherein:
the processor is configured to cause the display unit to increase the brightness of the group of dots for a greater amount of content variation in the image content, or
the processor is configured to cause the display unit to increase the brightness of the group of dots for lower tolerance of the viewer for carsickness.

3. The in-vehicle display device according to claim 1, wherein
the processor is configured to cause the display unit to decrease the brightness of the group of dots as a speed of the vehicle increases.

4. The in-vehicle display device according to claim 1,
the processor is configured to cause the display unit to move the group of dots at a lower end position of the display area to an upper side of the display unit as a speed of the vehicle increases.

5. An in-vehicle display device provided in a cabin of a vehicle, the in-vehicle display device comprising:
a display unit; and
a processor configured to cause the display unit to display image content and anti-carsickness content for suppressing carsickness of a viewer viewing the in-vehicle display device, wherein the anti-carsickness content includes a group of dots moving on the display unit to represent passing of an exterior scenery with respect to the vehicle as the vehicle travels, wherein the processor is configured to
identify a tolerance of the viewer for carsickness based on a detection signal from a visual sensor or a biometric sensor sensing the viewer,
in response to determining that the tolerance of the viewer for carsickness is higher than a first threshold, cause the display unit to display the image content without displaying the group of dots,
in response to determining that the tolerance of the viewer for carsickness is lower than a second threshold, cause the display unit to display the group of dots without displaying the image content, the second threshold being lower than the first threshold, and
in response to determining that the tolerance of the viewer for carsickness is lower than the first threshold and higher than the second threshold, cause the display unit to
display the image content and the group of dots at a periphery of the image content,
change a ratio of a display area of the image content to a display area of the anti-carsickness content to reduce the display area of the image content relative to the display area of the anti-carsickness content as (i) an amount of content variation of the image content increases, or (ii) the tolerance of the viewer for carsickness is lowered, and
decrease brightness of the group of dots in a difference region to be less than brightness of the group of dots displayed at an outside periphery of the difference region, and
the difference region is a region where the image content is displayed before the reduction of the display area of the image content and where the image content is not displayed after the reduction of the display area of the image content.

6. The in-vehicle display device according to claim 5, wherein
the amount of content variation of the image content is defined as a sum of differences in pixel values of each pixel in the display unit between consecutive frames.

7. The in-vehicle display device according to claim 6, wherein
the processor is configured to
cause the display unit to display a cross icon, wherein the cross icon includes
a vertical line extending across the display unit through a center point of the display unit, and partially hidden by the display area of the image content, and
a horizontal line extending across the display unit through the center point, and partially hidden by the display area of the image content, and
in response to detecting a tilt of the vehicle, cause the display unit to rotate the cross icon using the center point as an axis in accordance with the tilt of the vehicle.

8. The in-vehicle display device according to claim 7, wherein
the group of dots is represented by a mass of high-intensity pixels.

9. The in-vehicle display device according to claim 8, wherein:
the processor is configured to cause the display unit to increase the brightness of the group of dots for a greater amount of content variation in the image content, or the processor is configured to cause the display unit to increase the brightness of the group of dots for lower tolerance of the viewer for carsickness.

10. The in-vehicle display device according to claim 9, wherein
the processor is configured to cause the display unit to decrease the brightness of the group of dots as a speed of the vehicle increases.

11. The in-vehicle display device according to claim 10, wherein:
the processor is configured to cause the display unit to move the group of dots at a lower end position of the display area to an upper side of the display unit as a speed of the vehicle increases.

\* \* \* \* \*